Figure 1:
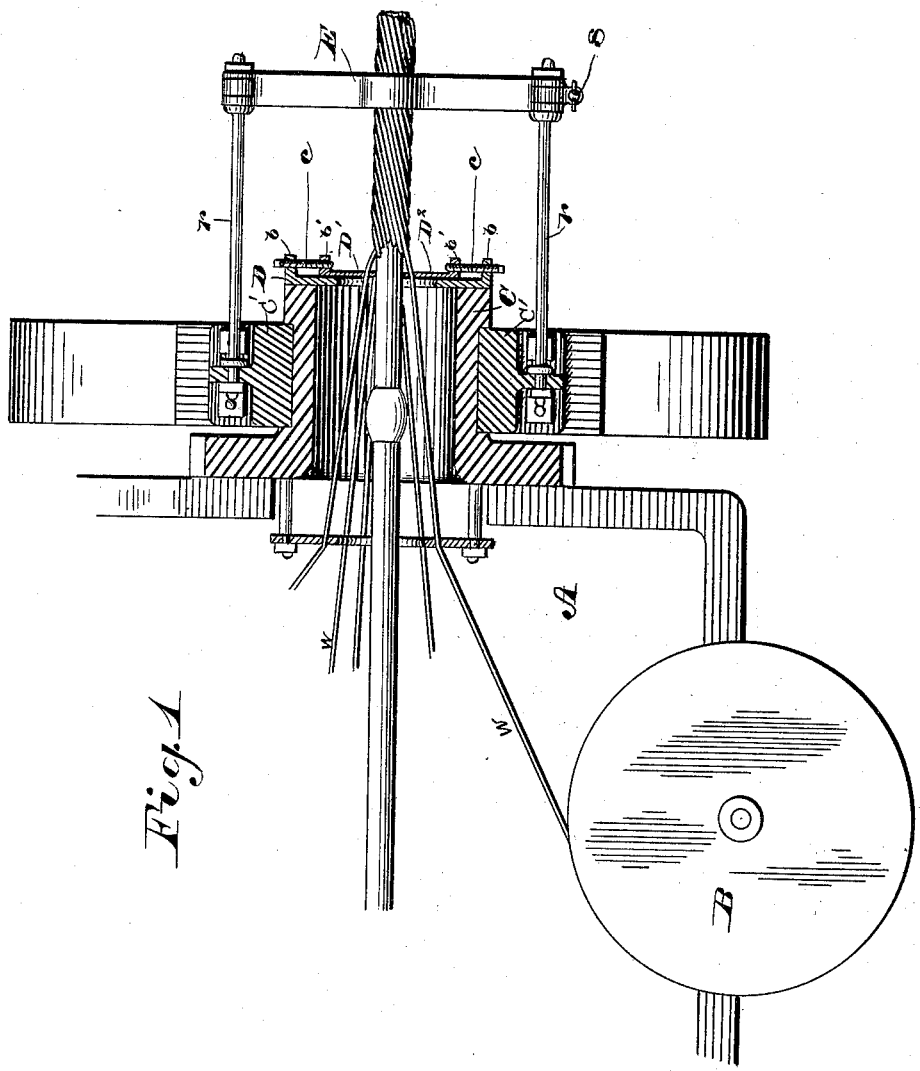

(No Model.) 4 Sheets—Sheet 1.

W. R. PATTERSON.
CABLE ARMORING MACHINE.

No. 330,047. Patented Nov. 10, 1885.

Attest
Paul A. Staley
Dand H. Patrick

Inventor
William R. Patterson
By George R. Barton
Attorney (No Model.)
W. R. PATTERSON.
CABLE ARMORING MACHINE.
No. 330,047. Patented Nov. 10, 1885.
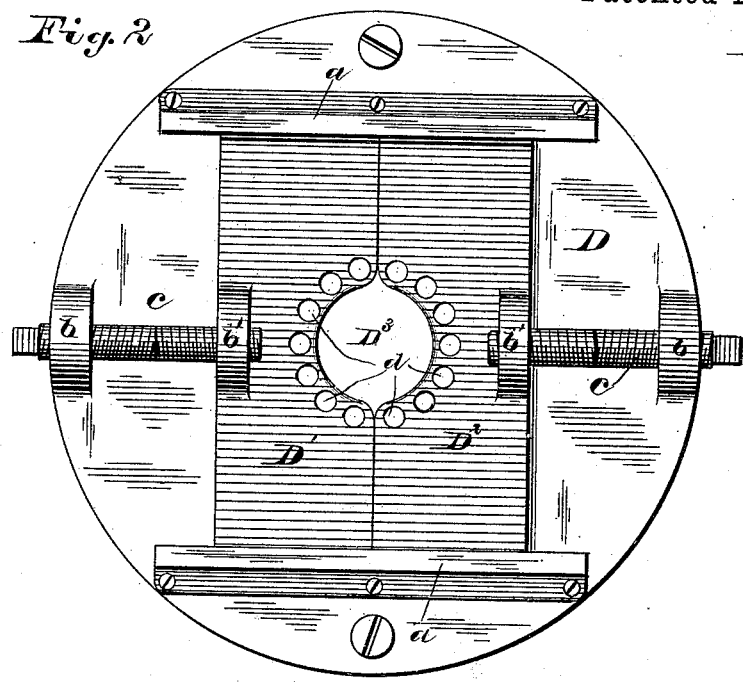
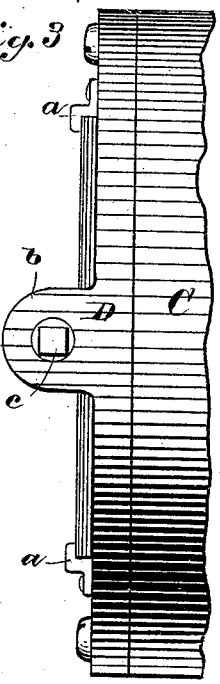
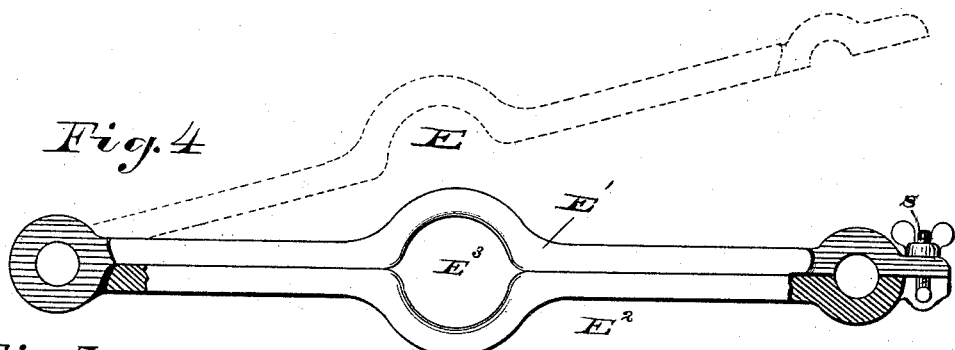
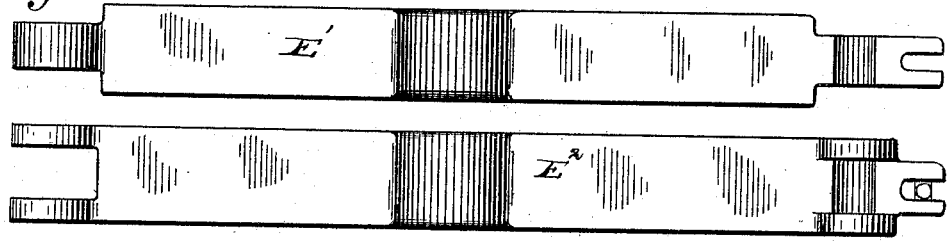
Attest
Paul A. Staley
Daul H. Patrick
Inventor
William R. Patterson
By George P. Barton
Attorney (No Model.) 4 Sheets—Sheet 3.
W. R. PATTERSON.
CABLE ARMORING MACHINE.
No. 330,047. Patented Nov. 10, 1885.
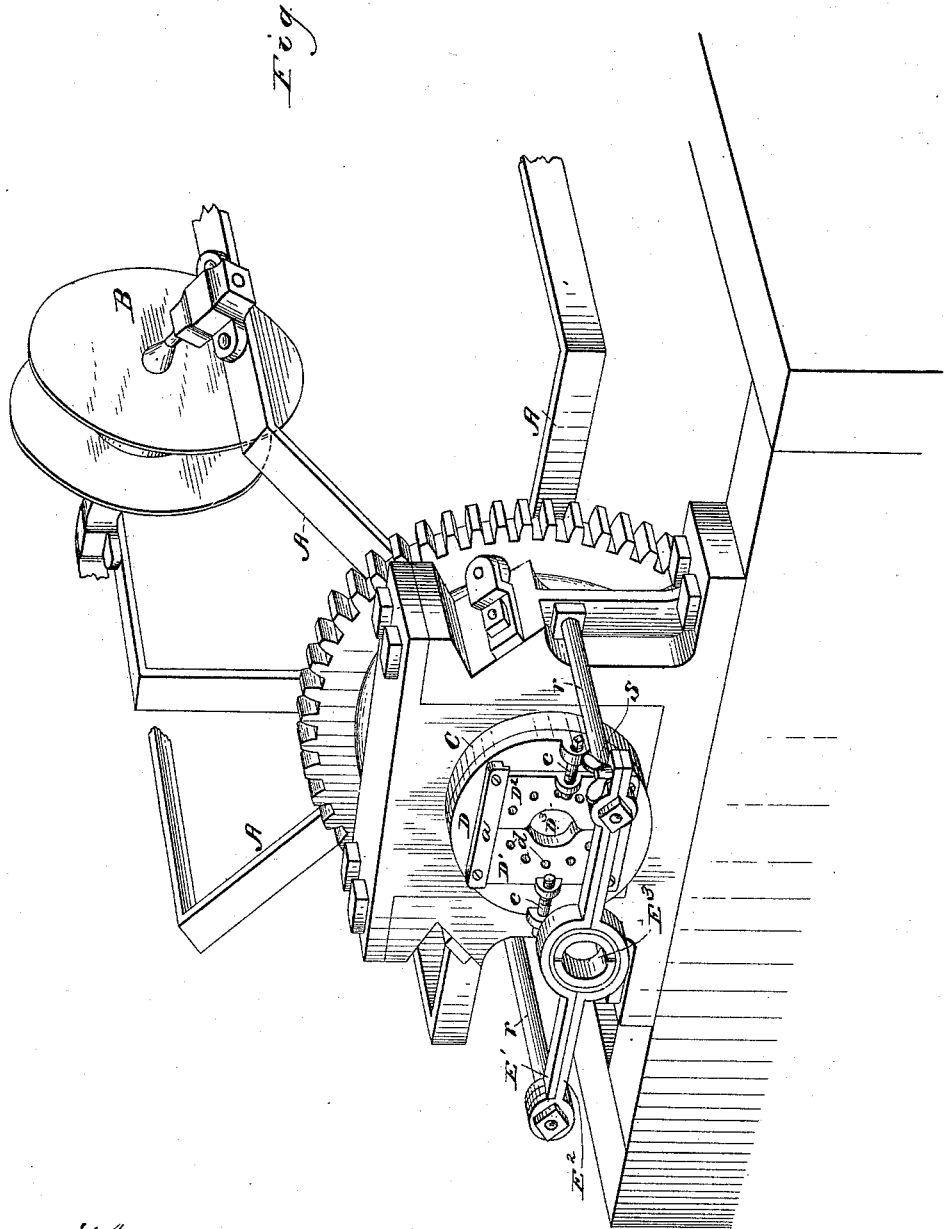

(No Model.)

W. R. PATTERSON.
CABLE ARMORING MACHINE.

No. 330,047. Patented Nov. 10, 1885.

4 Sheets—Sheet 4.

Witnesses.
Saml. B. Dover.
W. A. Kriedler.

Inventor.
William R. Patterson
By George P. Barton
Attorney

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

CABLE-ARMORING MACHINE.

SPECIFICATION forming part of Letters Patent No. 330,047, dated November 10, 1885.

Application filed April 19, 1883. Serial No. 92,282. (No model.)

*To all whom it may concern:*

Be it known that I, WILLIAM R. PATTERSON, a citizen of the United States, residing at Chicago, in the county of Cook and State of Illinois, have invented a certain new and useful Improvement in Cable-Armoring Machines, of which the following is a full, clear, concise, and exact description, reference being had to the accompanying drawings, forming a part of this specification.

My invention relates to machines for armoring electrical cables. In the manufacture of electrical cables lead pipe has been extensively used for an external casing for said cables, and in order to increase the strength of this external casing an armoring is applied thereto consisting of wires wound spirally around the lead pipe, as set forth in my Letters Patent No. 248,208, dated October 11, 1881. This armoring is applied by passing the cable through the axis of a cylindrical revolving frame, which carries a series of spools containing the wire which is to form the armoring. The wire from each spool passes through a separate hole in a draw-plate secured to and turning with the head of the revolving frame. The cable is drawn through the center of the draw-plate, and does not revolve, and the wires are thus laid spirally around the pipe, forming an armor. The cable thus armored passes through a compressor, consisting of a stationary plate or bar having an opening the exact size of the finished cable, which straightens out any slight crooks which the wires may contain and prevents the wires from climbing over each other. To insure the laying of the wires in a regular manner about the pipe without subjecting them to undue tension or strain, it is essential that the holes in the draw-plate through which the wires pass be brought as near as possible to the surface of the cable-pipe. The opening through which the cable passes must therefore be but slightly larger than the external diameter of the pipe. Now, in producing a cable of considerable length, it becomes necessary to join several sections of pipe together, and the pipe is necessarily enlarged at each joint.

The object of my invention, therefore, is to provide for the passage of these enlarged joints through the armoring-machine, and at the same time retain the essential features of said machine, as above set forth.

My invention consists in constructing the draw-plate in such a manner that the central opening therein, through which the cable passes, may be enlarged to permit the passage of the enlargements of the cable-pipe.

My invention further consists in improvements in the compressor, and in combinations hereinafter described and claimed.

Figure 7:
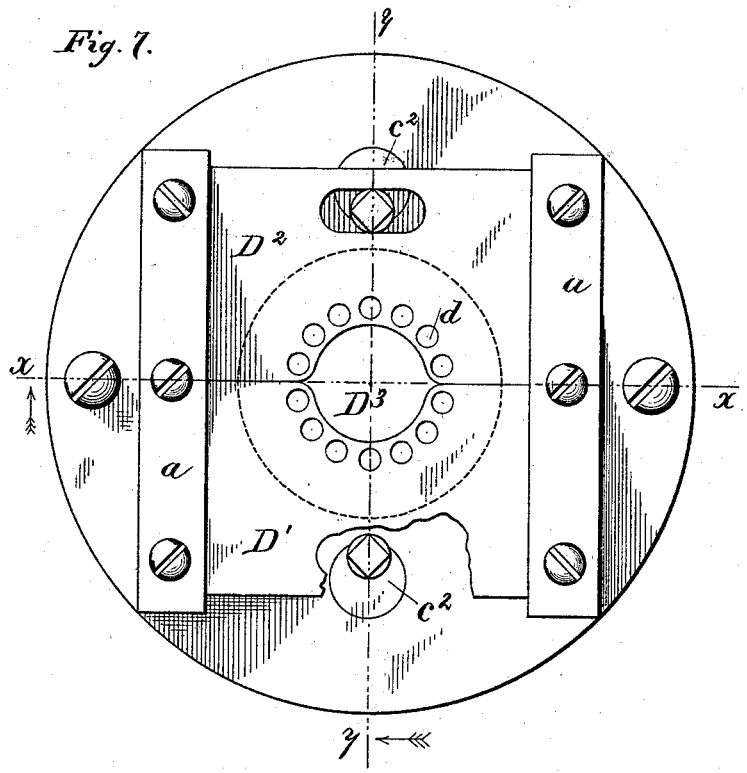
Figure 8:
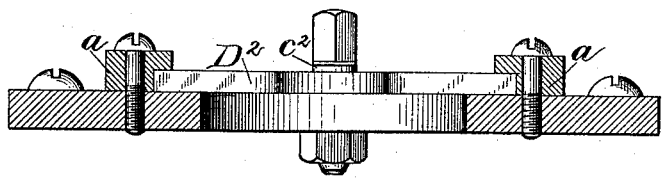
Figure 9:
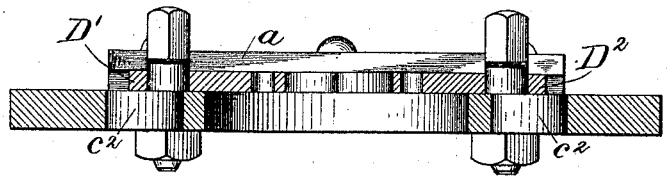

In the accompanying drawings, Figure 1 is a sectional view through the head of an armoring-machine to which my invention has been applied. Fig. 2 is a front elevation of the draw-plate enlarged. Fig. 3 is a side elevation of the same. Fig. 4 is a sectional side elevation of the compressor, (shown enlarged,) but on a smaller scale than the draw-plate, as shown in Figs. 2 and 3. Fig. 5 is a view of the same, showing the parts in detail. Fig. 6 is a perspective view of a portion of the armoring-machine, showing my invention applied thereto. Figs. 7, 8, and 9 are detailed views showing a modified form of the means for separating the draw-plates.

In the drawings, A represents the revolving frame of an armoring-machine; B, one of the spools thereon on which the wire for the armor is wound, the remaining spools not being shown.

C is the revolving head, which turns in a suitable bearing, C′, in the ordinary manner. Secured to the revolving head C is a plate, D, having a central opening large enough to permit the free passage of the enlarged joints of the pipe and of the armoring-wires. This plate D is provided with slides $a\ a$, in which slide two plates, D′ D², which, when closed together, form a central opening, D³, through which the cable to be armored is drawn, and which is but slightly larger than the external diameter of the cable-pipe. On opposite sides of the plate D are lugs $b\ b$, through each of which screws one end of a right-and-left screw, $c$, the other end of each of said screws being screwed into a lug, $b'$, on each of the movable plates D′ D². Each of the movable plates D′ D² is provided with a series of holes, $d$, placed as near the central opening, D³, as consistent with strength and durability. Through these holes $d$ the wires $w$ from the spools B are run. Supported at a short distance in front of the draw-plate by suitable rods, $r\ r$, is the compressor E, provided with an opening, $E^3$, the exact size of the finished cable, through which the armored cable passes. This compressor I make in two parts, $E'\ E^2$, hinged together in such a manner that the upper one, $E'$, may be raised, as shown in dotted lines in Fig. 4. The parts are normally held together by means of a thumb-screw, $s$, or in any other suitable manner.

The operation is as follows: The frame A being revolved in any well-known manner, the cable is slowly drawn through the machine, and the wires from the spools on the revolving frame passing through the draw-plate, which is revolved with said frame, are laid spirally around the pipe in a regular manner. The central opening in the draw-plate being just large enough to allow the cable to pass through, the wires are kept close to the surface of the pipe, and the tension or strain thereon is reduced to the minimum. When an enlargement in the cable-pipe is reached, the movable plates $D'\ D^2$ are drawn apart by turning the screws $c\ c$, thus enlarging the opening $D^3$ sufficiently to allow the enlargement to pass through. In a similar manner the enlargement is allowed to pass the compressor by raising the part $E'$, as indicated by dotted lines in Fig. 4.

The number of wires used for the armoring is just sufficient to completely cover the surface of the cable-pipe, and consequently the enlargements at the joints will not be completely covered thereby; but, as the metallic covering of the cable is considerably thicker here than at other points, the armor is not necessary.

It will be seen from Figs. 7, 8, and 9 that the means for separating plates $D'\ D^2$ may be varied, as desired, the eccentrics or cams $c^2\ c^2$ taking the place of the screws $c\ c$. (Shown in Figs. 2 and 3.) By simply applying a key the eccentrics may be turned, so as to separate plates $D'\ D^2$, thus enlarging opening $D^3$ sufficiently to permit the joints to pass. The corners of the plates next to opening $D^3$ are cut away, so that when the plates are separated but a short distance the opening will be large enough for the joint.

I claim as my invention—

1. The combination, with the guides $a\ a$, of plates $D'\ D^2$, provided with the holes $d$ for the wires, and the screw mechanism for separating said plates, whereby the opening $D^3$ may be enlarged to allow the joint or enlarged portion of the cable to pass, substantially as described.

2. The combination, with the reel and means for operating the same, of spools B, the draw-plate consisting of sections $D'\ D^2$, provided with holes $d$, the corners of said plates, near opening $D^3$, being cut away or rounded, the guides $a$, and the mechanism for regulating the size of said opening $D^3$ by moving the sections $D'$ and $D^2$ toward or away from each other, whereby the cable may be armored over the joints, substantially as and for the purpose specified.

3. The combination, with the sectional draw-plate, and mechanism for separating the sections thereof to enlarge the opening $D^3$, of the compressor, E, placed in front of the draw-plate and at a short distance therefrom, and the revolving reel provided with the spools B, and means for operating said reel, whereby the cable may be armored over the joints thereof and the wires of the armor compressed to form a single layer about the lead pipe of the cable, substantially as and for the purpose specified.

In witness whereof I hereunto subscribe my name this 28th day of March, A. D. 1883.

WILLIAM R. PATTERSON.

Witnesses:
GEORGE A. BARTON,
PAUL A. STALEY.